United States Patent [19]

Kiskis

[11] Patent Number: 4,905,893
[45] Date of Patent: Mar. 6, 1990

[54] RESERVE AUTOMOBILE HEATING SYSTEM

[76] Inventor: James M. Kiskis, 525 Magnolia Dr., Gallipolis, Ohio 45631

[21] Appl. No.: 288,127

[22] Filed: Dec. 22, 1988

[51] Int. Cl.$^4$ ............................................... G05D 23/00
[52] U.S. Cl. .................................. 237/2 A; 237/12.3 B
[58] Field of Search ............. 237/2 A, 12.3 A, 12.3 B, 237/12.3 C; 165/41, 42

[56] References Cited

U.S. PATENT DOCUMENTS 2,749,048 6/1956 Edge ............................... 237/12.3 B Primary Examiner—Henry A. Bennet
Attorney, Agent, or Firm—H. Jay Spiegel

[57] ABSTRACT

The present invention relates to a heating system for the passenger compartment of a motor vehicle which uses the laden heat of the vehicle engine to heat the passenger compartment when the engine is not running. The invention includes a heat exchanger fluidly connected into engine cooling system, a fan designed to blow air through the heat exchanger and a circulation pump which may be operated responsive to manual or automatic control to circulate coolant through the heat exchanger whereby the fan may blow air through the heat exchanger and then into the passenger compartment to heat the passenger compartment.

4 Claims, 1 Drawing Sheet

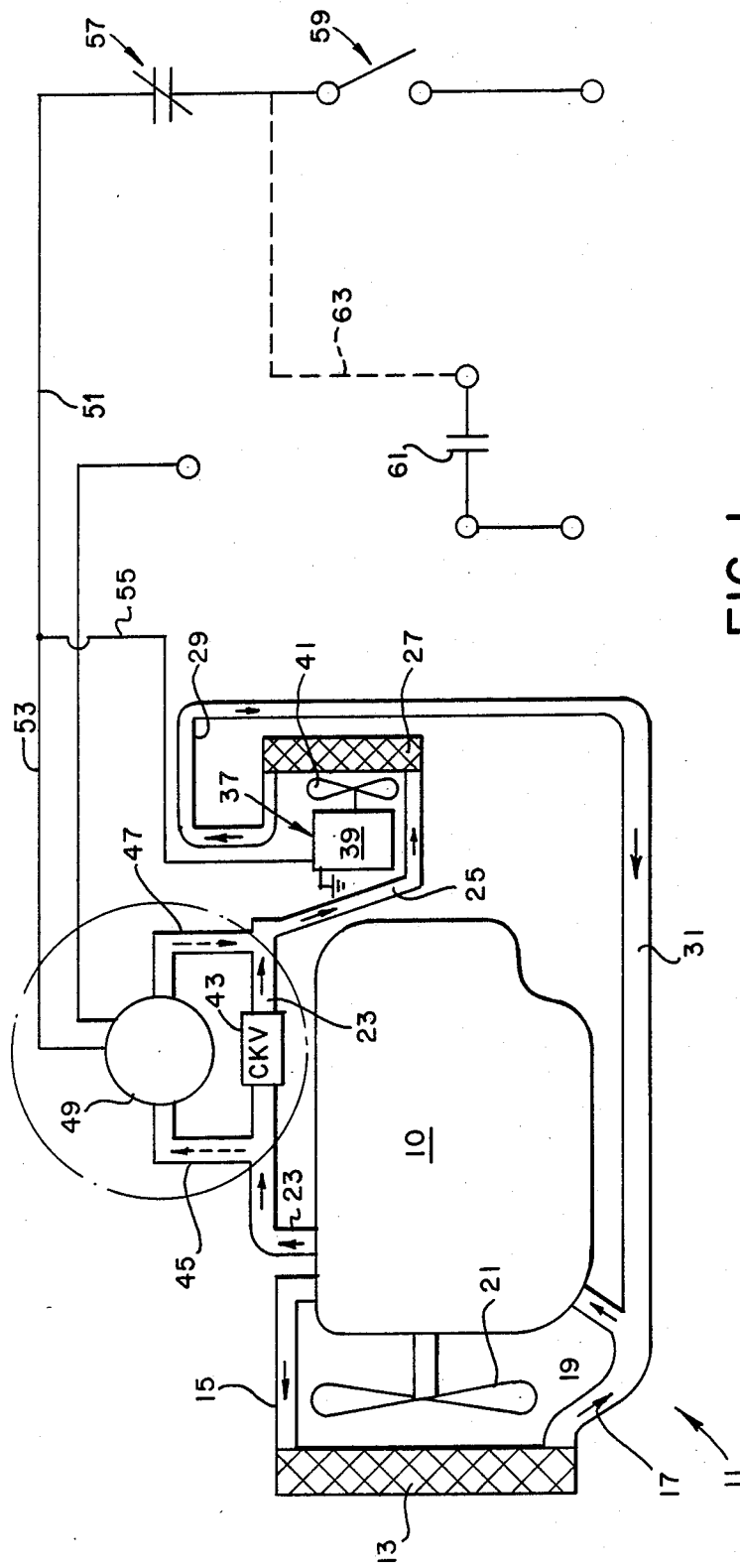
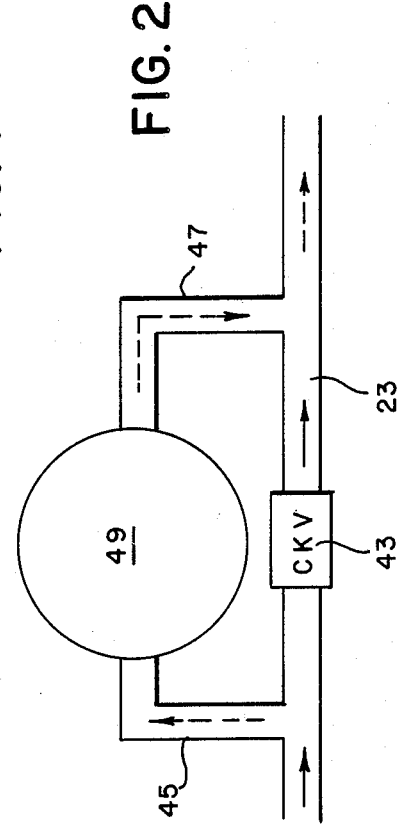
FIG. 1
FIG. 2

RESERVE AUTOMOBILE HEATING SYSTEM

BACKGROUND OF THE INVENTION

The present invention relates to a reserve automobile heating system. In the prior art, heating systems for vehicles are well known, however, none is known to applicant which proposes to heat the passenger compartment of a motor vehicle when the engine is not running and in the precise manner with which the present invention operates.

The following prior art is known to applicant: U.S. Pat. No. 3,496,855 to De Boer discloses an augmented automobile heating system designed to be used before the vehicle engine warms up sufficiently to provide adequate heat to the passenger compartment. The De Boer device uses an auxiliary electric heater mechanism powered by the vehicle battery. This is different from the teachings of the present invention which only operates after the vehicle engine has already warmed up and which does not use an electrical heater but, rather, uses laden heat from the engine to heat the passenger compartment.

U.S. Pat. No. 3,498,539 to Boehmfeld discloses a heating system for internal combustion engines which includes a holding tank designed to be used to store heated coolant for later use in heating the passenger compartment of the vehicle. This is different from the teachings of the present invention in that the present invention does not require the use of an additional tank and the complicated plumbing which the Boehmfeld et al, invention requires but, rather, merely requires that circulation of coolant through the engine block to pick up heat therefrom and transport the heat, fluidly, to a heat exchanger.

U.S. Pat. No. 4,556,171 to Fukami discloses a heating system for automobiles with heat storage tank. The Fukami et al device, as in the Boehmfeld et al device, uses a heat accumulating hot water tank. This tank is designed to not only provide for interior heating but also to provide a warming up function for the engine as well as an engine overheating preventive function. Again, this is different from the teachings of the present invention which does not require any tank or the complicated plumbing which is taught by Fukami et al. U.S. Pat. No. 4,591,691 to Badali discloses an auxiliary electric heating system for internal combustion engine powered vehicles which includes an electrical heating element to heat coolant which is circulated by an electric pump. Of course, this is different from the teachings of the present invention which uses no electrical heating means but, rather, only uses the laden heat which is contained within the vehicle engine as a result of the operation thereof.

SUMMARY OF THE INVENTION

The present invention relates to a reserve automobile heating system. The present invention includes the following interrelated aspects and features:

(a) In a first aspect, the present invention contemplates coolant flow passages extending through the various coolant passage ways of the engine and including, adjacent the passenger compartment, a heat exchanger incorporated into the coolant flow lines.

(b) Adjacent this heat exchanger is located at electrically operated fan. The heat exchanger has passage ways around the fluid flow passages thereof through which the fan may blow air with the air on the other side of the heat exchanger being blown into the passenger compartment via suitable vent means (not shown).

(c) An electric pump is fluidly interconnected into the coolant flow passages and may be selectively operated either manually, by a thermostatic control, or both, to cause flow of coolant through the coolant flow passages when the engine is not operating. In the preferred embodiment, the electric pump is incorporated into the coolant flow passages by installing a check valve in a coolant flow passage with the electric pump fluidly connected in parallel about the check valve so that when the electric is operating, reverse flow through the check valve is prevented and, whereby, when the electric pump is not operating, normal operation of the engine and flow of coolant through the coolant flow passages may continue unimpeded.

Accordingly, it is first object of the present invention to provide a reserve automobile heating system.

It is further object of the present invention to provide a reserve automobile heating system which utilizes laden heat in the engine after it has operated for a period of time to heat the passenger compartment of the vehicle.

It is a still further object of the present invention to provide such a system wherein an electric pump may be selectively actuated to cause flow of coolant through a heat exchanger whereby an electric fan may blow air through the heat exchanger and thence into the passenger compartment of the vehicle to heat same.

These and other objects, aspects and features of the present invention will be better understood from the following detailed description of the preferred embodiment when read in conjunction with the appended drawing Figure.

BRIEF DESCRIPTION OF THE DRAWING

FIG. 1 shows a schematic representation of the present invention.

SPECIFIC DESCRIPTION OF THE PREFERRED EMBODIMENT

With reference to the sole Figure, the engine 10 includes interior coolant flow passages (not shown) which are fluidly interconnected with an exterior engine coolant system generally designated by the reference numeral 11 in the Figure.

This coolant system includes the engine radiator 13, a flow passage 15 fluidly connecting the engine block to the radiator 13, a flow passage 17 allowing coolant fluid to flow from the radiator 13 and an inlet conduit 19 connected between the flow passage 17 and the engine 10 to allow coolant to flow back into the engine block after it has been cooled by flow through the radiator 13 with the fan 21 pulling air therethrough due to operation of the engine 10.

The coolant system 11 further includes a parallel set of flow passages designed to be used in heat the passenger compartment. These passages include an outlet conduit 23 connected to a further conduit 25 also constituting an inlet conduit for the heat exchanger 27, a further conduit 29 also constituting the outlet conduit from the heat exchanger 27, and a further conduit 31 interconnected between the conduit 29 and the inlet conduit 19 to complete the loop.

An electrically operated fan 37 including a fan motor 39 and fan blades 41 is mounted adjacent the heat exchanger 27 so that rotation of the blades 41 may blow air through passage ways (not shown) extending through the heat exchanger adjacent coolant flow passage ways (not shown) to allow the air so blown therepast to pick heat from the coolant via the heat exchanger.

The conduit 23 includes a check valve 43 provided to ensure flow of fluid in the right hand direction in the Figure. Branch passage way 45 connects with branch passage way 47 to form a loop around the check valve 43 with an electrically operated pump 49 being fluidly interconnected into the loop formed by the conduits 45 and 47.

The sub-system formed by the flow passage 23, the branch conduits 45 47, electric pump 49 and the check valve 43 ensures that flow through the flow passage 23 will always be in the right-hand direction in the Figure and, when the electrically operated pump 49 is not operating, flow of coolant may continue unimpeded through the flow passage way 23. On the other hand, when the electrically operated pump 49 is activated, fluid will be pumped in the same direction through the flow passage way 23, conduit 45, pump 49, conduit 47, flow passage way 23 and flow passage 25 with a check valve 43 preventing reverse flow.

The electric pump 49 and heat exchanger fan 37 are controlled by an electrical circuit including positive electrical conductor 51, the conductor 53 which connected the conductor 51 to the positive terminal of the electrically operated pump 49, electrical conductor 55 which connects the conductor 51 with the positive terminal of the heat exchanger fan motor 39, high temperature limit switch 57, on/off switch 59 and various connections to ground.

The high temperature limit switch 57 is provided so that when the passenger compartment of the vehicle is heated to a sufficiently high enough temperature as pre-set the high temperature limit switch will open the circuit to prevent unnecessary operation.

In a further aspect, if desired, a thermostat 61 may be incorporated into the electrical circuit to allow a predetermined temperature to be set and maintained. In such case, the thermostat 61 would be interconnected into the electrical circuitry by virtue of an electrical conductor 63 shown in dotted lines in the sole Figure.

In the operation of the system described hereinabove, when the engine 10 is operating, the water pump of the engine will adequately circulate coolant through the conduit 15, the radiator 13, the flow passage 17, the inlet conduit 19 and through the engine block. Similarly, flow of coolant will take place through the flow passage 23, the check valve 43, the flow passage 25, the heat exchanger 27, the flow passage 29, the flow passage 31 and back to the inlet conduit 19. During operation of the engine 10, the engine 10 will generate large amounts of heat which will be retained in the engine block and within the coolant after the engine has been deactivated.

In such circumstance, where it is desired to use the laden heat contained within the engine and the coolant to heat the passenger compartment of the vehicle, the switch 59 is closed to thereby activate the electrically operated pump 49 and fan 37. Under such condition, the electrically operated pump 49 will circulate coolant from the engine block through the flow passage 23, the conduit 45, the electrically operated pump 49, the conduit 47, the flow passage 23, the flow passage 25, the heat exchanger 27, the flow passage 29, the flow passage 31, and the inlet conduit 19. Meanwhile, the check valve 43 will prevent reverse flow of coolant. While the coolant is flowing through the fluid circuit described above, the fan 37 will blow air through air passage ways (not shown) extending through the heat exchanger 27 adjacent the fluid flow passage ways thereof, to pick up heat from the coolant and carry it into the passenger compartment of the vehicle by a suitable vent means (not shown). Either or both of the high temperature limit switch 57 and/or the thermostat 61 may be used to control the operation of the inventive device, with the thermostat being setable at a desired passenger compartment temperature and being operative to deactivate electrically operated pump 49 and blower 37 when a predetermined temperature has been achieved. In the same manner, the high temperature limit switch may be used to deactivate the system upon achieving of a high temperature.

As such, an invention has been disclosed in terms of a preferred embodiment thereof which fulfills each and everyone of the objects of the present invention and provides a new and improved reserved automobile heating system which may heat the passenger compartment of a vehicle by appropriating laden heat from an engine which has operated to produce such latent heat. Of course, various modifications, changes and alterations in the teachings of the present invention may be contemplated by those skilled in the art without department from the intended spirit and scope of the present invention. As such, it is intended that the present invention only be limited by the terms of the appended claims.

I claim:

1. In a vehicle having an engine and a cooling system therefor, said cooling system having a fluid flow system for conveying engine coolant from within the engine to and from coolant heat exchange means to cool said coolant, said engine including pump means for circulating coolant through said fluid flow system, the improvement comprising:
    (a) a further heat exchange means incorporated into said fluid flow system;
    (b) blower means for blowing air through said further heat exchange means to capture heat from said coolant and thence to blow into a passenger compartment of said vehicle to heat same;
    (c) circulation means for circulating coolant through said fluid flow system when said engine is not operating; and
    (d) control means for controlling operation of said blower means and said circulation mean, said control means including temperature sensing means for sensing temperature in said passenger compartment and for causing said control means to deactivate said blower means and said circulation means when said temperature is at a particular temperature.

2. The invention of claim 1, further including a check valve mounted in said fluid flow system and said circulation means being located in parallel about said check valve.

3. The invention of claim 2, wherein said circulation means comprises a pump.

4. The invention of claim 1, wherein said control means includes an on-off switch and an adjustable thermostat mounted in said passenger compartment said adjustable thermostat comprising said temperature sensing means.

* * * * *

UNITED STATES PATENT AND TRADEMARK OFFICE
CERTIFICATE OF CORRECTION

PATENT NO. : 4,905,893

DATED : March 6, 1990

INVENTOR(S) : James M. Kiskis

It is certified that error appears in the above-identified patent and that said Letters Patent is hereby corrected as shown below:

```
In column 2, line 12,
insert--pump-- after "electric".

In column 3, line 14, insert
a comma after "45".
```

Signed and Sealed this

Twentieth Day of August, 1991

*Attest:*

*Attesting Officer*

HARRY F. MANBECK, JR.

*Commissioner of Patents and Trademarks*